United States Patent
Li et al.

(10) Patent No.: US 11,697,912 B2
(45) Date of Patent: Jul. 11, 2023

(54) MULTIFUNCTIONAL FLOATING BREAKWATER

(71) Applicant: LUDONG UNIVERSITY, Yantai (CN)

(72) Inventors: Xueyan Li, Yantai (CN); Zhi Cheng, Weifang (CN); Qing Wang, Shanghai (CN); Gang Wang, Nanjing (CN); Chunyi Xiu, Yantai (CN); Fang Hou, Heze (CN)

(73) Assignee: LUDONG UNIVERSITY, Yantai (CN)

( * ) Notice: Subject to any disclaimer, the term of this patent is extended or adjusted under 35 U.S.C. 154(b) by 0 days.

(21) Appl. No.: 17/572,651

(22) Filed: Jan. 11, 2022

(65) Prior Publication Data
US 2023/0068166 A1 Mar. 2, 2023

(30) Foreign Application Priority Data
Sep. 2, 2021 (CN) .......................... 202111024501.X

(51) Int. Cl.
*E02B 3/06* (2006.01)
*B63B 35/38* (2006.01)

(52) U.S. Cl.
CPC .................................. *E02B 3/062* (2013.01); *B63B 35/38* (2013.01)

(58) Field of Classification Search
CPC ........... E02B 3/062; Y02A 10/11; B63B 35/38
See application file for complete search history.

(56) References Cited

U.S. PATENT DOCUMENTS

| | | | | |
|---|---|---|---|---|
| 3,969,900 A * | 7/1976 | Plodowski | ............... | E02B 3/06 405/23 |
| 5,529,013 A * | 6/1996 | Eva, III et al. | ........... | B63C 1/02 114/263 |
| 5,888,024 A * | 3/1999 | Mills et al. | ............. | B63B 35/38 114/263 |
| 5,911,542 A * | 6/1999 | Obrock et al. | ........... | B63B 3/06 405/219 |
| 2010/0282155 A1* | 11/2010 | Mattson | ................ | B63B 35/34 114/266 |
| 2012/0251243 A1* | 10/2012 | Smith | ................. | E02B 15/0885 405/26 |
| 2014/0182505 A1* | 7/2014 | Imel et al. | ............. | B63B 35/38 114/263 |
| 2016/0053454 A1* | 2/2016 | Neelamani et al. | .... | E02B 3/062 405/26 |
| 2020/0128798 A1* | 4/2020 | Shi et al. | ................. | F03D 9/43 |
| 2021/0115639 A1* | 4/2021 | Kettavong | ............... | E02B 3/06 |

FOREIGN PATENT DOCUMENTS

| | | | | |
|---|---|---|---|---|
| CN | 202369965 | * | 8/2012 | |
| CN | 109371898 | * | 2/2019 | .................E02B 3/062 |
| CN | 111188311 | * | 5/2020 | |
| CN | 210766610 | * | 6/2020 | .................Y02A 10/11 |
| CN | 211849248 | * | 11/2020 | .................Y02A 10/11 |

* cited by examiner

*Primary Examiner* — Carib A Oquendo
(74) *Attorney, Agent, or Firm* — WPAT, PC

(57) ABSTRACT

A multifunctional floating breakwater includes: a plank platform, a first buoy, a second buoy, a first wave baffle, a second wave baffle, a first arc breast wall, a second arc breast wall, upper inclined supports, lower inclined supports and a net cage. The multifunctional floating breakwater integrates a floating breakwater and a wave-energy power generation device, which can not only maintain good stability of the water surface in a harbor, but also generate electric energy, and allow for aquaculture and other activities as well, and has advantages of being movable and not limited by water depth and geology. In addition, the invention has a simple structure, easy production and maintenance, no pollution to the marine environment and therefore wide application prospects.

7 Claims, 3 Drawing Sheets

MULTIFUNCTIONAL FLOATING BREAKWATER

TECHNICAL FIELD

The invention relates to the technical field of floating wave-proof equipment, in particular to a multifunctional floating breakwater.

BACKGROUND

In order to solve the issue of energy supply that is essential for human development at present, it has gradually become the consensus of all countries in the world to find alternative, renewable and clean new energy sources. New energy sources, including ocean energy, biomass energy, wind energy, solar energy, geothermal energy, nuclear energy, etc., and ocean energy attracts the attention of scientific researchers all over the world because of its unique superiority.

Breakwater, as a conventional marine engineering structure, mainly plays the role of preventing and dissipating waves, improving the berthing conditions in the harbor and keeping designated waters steady. Floating breakwater has been widely used in recent years because of low construction costs, no limitation of seabed geological conditions, rapid construction and convenient demolition, while the conventional floating breakwater has a singular function, and resources cannot be exploited in diverse ways.

SUMMARY

An objective of the invention is to overcome the shortcomings of the prior art and propose a multifunctional floating breakwater.

A technical scheme provided by the invention may be that the multifunctional floating breakwater includes a plank platform, a first buoy, a second buoy, a first wave baffle, a second wave baffle, a first arc breast wall, a second arc breast wall, upper inclined supports, lower inclined supports and a net cage;

the middle part of the plank platform is provided with an opening; two ends of the lower surface of the plank platform are connected with the wave baffles respectively, and two ends of the upper surface are connected with the arc breast walls respectively; the first buoy is fixed on the left side of the net cage on the lower surface of the plank platform, and the second buoy is fixed on the right side of the net cage on the lower surface of the plank platform; the first buoy and the second buoy are semi-cylindrical, and semi-circular opening surfaces thereof are fixedly connected with the lower surface of the plank platform; the upper end of the first wave baffle is fixedly connected to the left end of the lower surface of the plank platform and perpendicular to the plank platform; the upper end of the second wave baffle is fixedly connected to the right end of the lower surface of the plank platform and perpendicular to the plank platform; the lower end of the first arc breast wall is fixedly connected to the left end of the upper surface of the plank platform, and the concave surface of the first arc breast wall faces the outside of the plank platform; the lower end of the second arc breast wall is fixedly connected to the right end of the upper surface of the plank platform, and the concave surface of the second arc breast wall faces the outside of the plank platform; two ends of the upper inclined supports are respectively fixedly connected to the upper surface of the plank platform and the convex surfaces of the arc breast walls; two ends of the lower inclined supports are respectively fixedly connected to the lower surface of the plank platform and the inner surfaces of the wave baffles; the net cage is fixedly connected to the lower surface of the plank platform and located between the first buoy and the second buoy.

Furthermore, the opening at the middle of the plank platform is directly connected into the net cage on the lower surface of the plank platform.

Furthermore, the upper inclined supports are arranged/disposed at predetermined intervals between the upper surface of the plank platform and the first arc breast wall as well as the second arc breast wall.

Furthermore, the lower inclined supports are arranged at predetermined intervals between the lower surface of the plank platform and the first wave baffle as well as the second wave baffle.

Furthermore, each of the first buoy and the second buoy is spliced by a plurality of sub buoys, or is an integrally formed structure (also referred to as to one-piece structure).

Furthermore, the concave surfaces of the first arc breast wall and the second arc breast wall are provided with holes, and rotating wheels are arranged in the holes.

Furthermore, left and right ends of the plank platform are respectively provided with chains.

The invention has substantial characteristics and remarkable progress: (1). the multifunctional floating breakwater of the invention not only mitigates the influence of waves, but also provides a stable water environment for surrounding water areas, and meanwhile converts part of wave energy into electric energy, so as to reasonably utilize ocean wave energy resources; (2). the lower part of the breakwater is equipped with the net cage, which may be used by local fishermen for aquaculture and other activities, and at the same time, it may develop feature fishing and other businesses; (3). the multifunctional floating breakwater has good structural integrity, low costs, high utilization rates, easy use, light-weighted structure and not much consumption of component materials; (4). the mechanical properties of all parts of the structure are good and the structure is stable; (5). the breakwater can adjust the length of the wave baffles according to the actual engineering conditions, and the length of the wave baffles may be adjusted according to the wave conditions such as the water depth in the actual area and the main frequency wave height in the spectrum, so as to improve the wave-eliminating effect of the whole breakwater structure; and (6). the structure bears small stress, the water exchange capacity and shielding effect are good, and the structural type is simple, which is convenient for practical engineering application.

In FIGs: 1: plank platform, 2: first buoy, 3: second buoy, 4: first wave baffle, 5: second wave baffle, 6: first arc breast wall, 7: second arc breast wall, 8: upper inclined support, 9: lower inclined support, 10: net cage, 11: rotating wheel, 12: chain.

DETAILED DESCRIPTION OF EMBODIMENTS

In order to facilitate further understanding of the content, characteristics and functions of the invention, the detailed description is provided as follows with the accompanying drawings.

Figure 1:
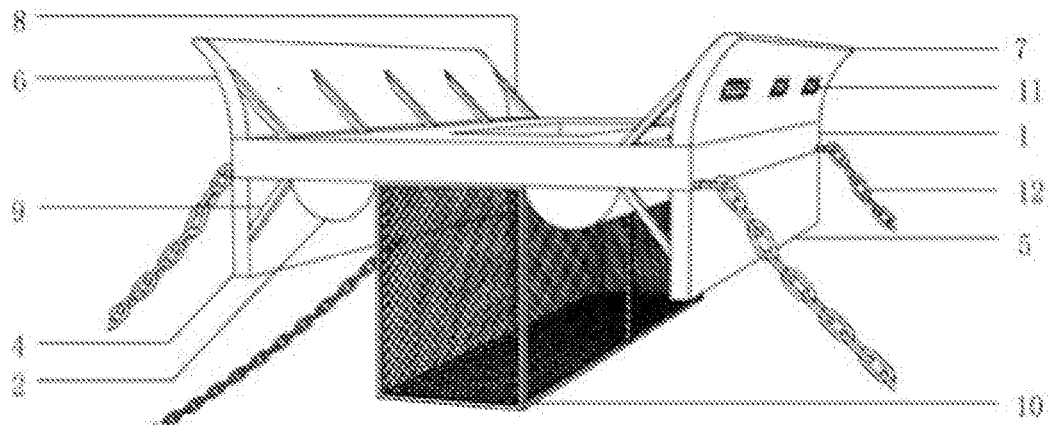
FIG. 1 is a schematic structural view of an overall effect of the invention.
Figure 2:
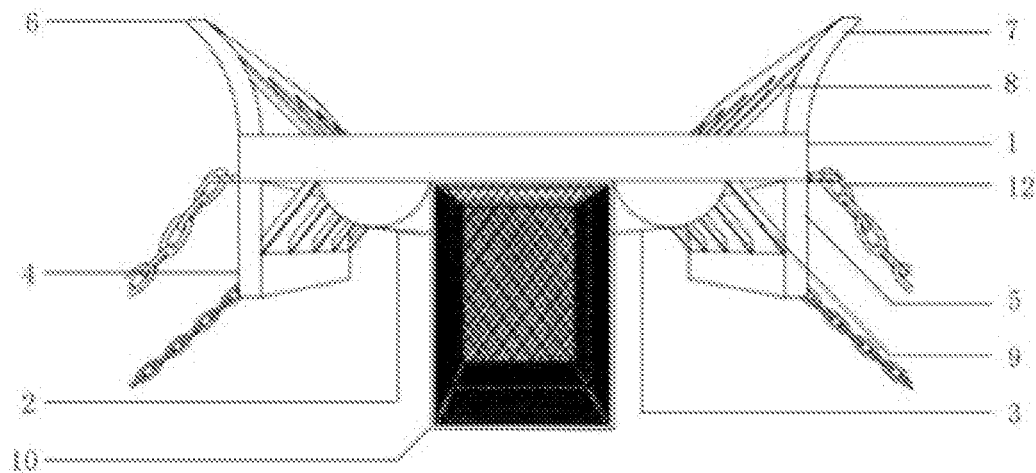
FIG. 2 is a schematic front viewed structure of the invention.
Figure 3:
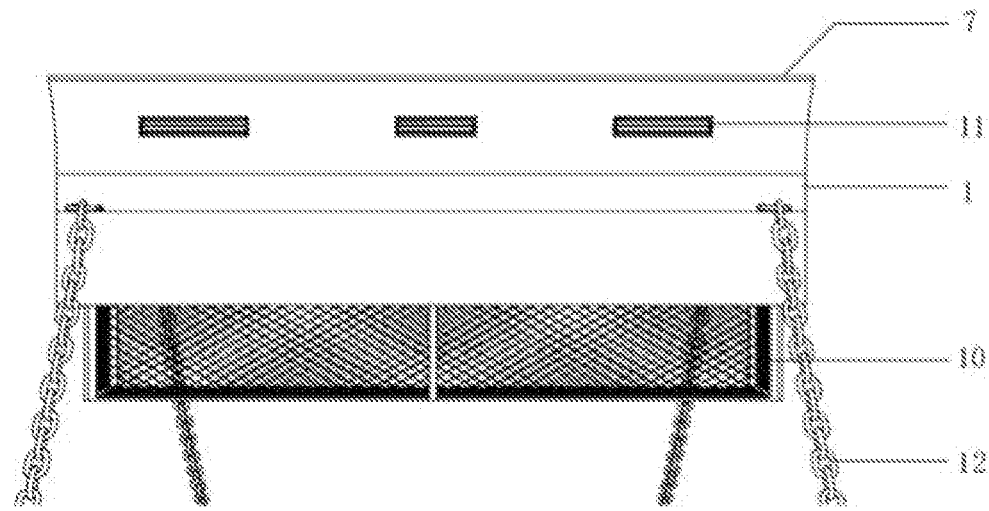
FIG. 3 is a schematic side viewed structure of the invention.
Figure 4:
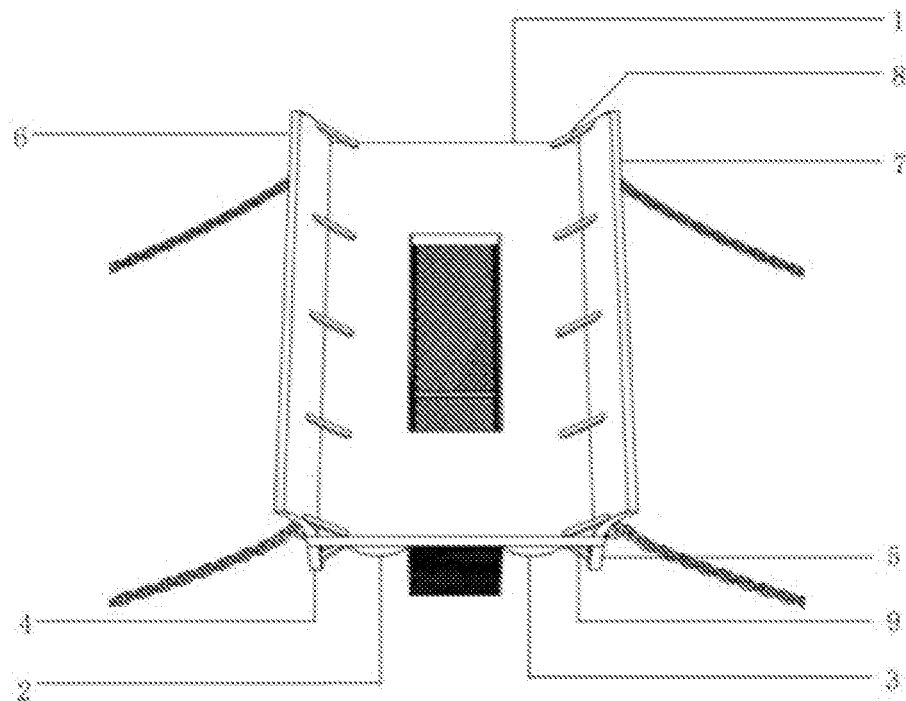
FIG. 4 is a schematic top viewed structure of the invention.
Figure 5:
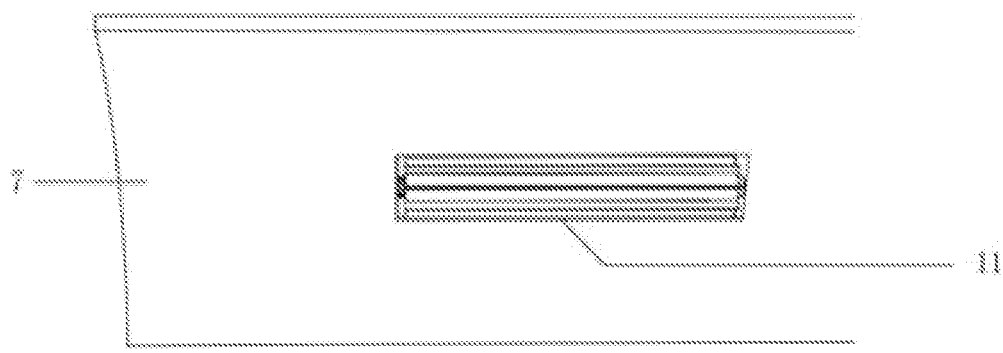
FIG. 5 is a schematic view of a rotating wheel of the invention.

As shown in FIGS. 1-5, the multifunctional floating breakwater includes the plank platform 1, the first buoy 2, the second buoy 3, the first wave baffle 3, the first wave baffle 4, the second wave baffle 5, the first arc breast wall 6, the second arc breast wall 7, the upper inclined supports 8, the lower inclined supports 9, the net cage 10, rotating wheels 11 and chains 12. The plank platform 1, the first buoy 2, the second buoy 3, the first wave baffle 3, the second wave baffle 5, the first arc breast wall 6, the second arc breast wall 7, the upper inclined supports 8, the lower inclined supports 9 are made of polyethylene (PE) materials.

The middle part of the plank platform 1 is provided with an opening, the opening is directly connected into the net cage 10; two ends of the lower surface of the plank platform 1 are connected with the wave baffles respectively, and two ends of the upper surface are connected with the arc breast walls respectively; the net cage 10 is fixedly connected to the lower surface of the plank platform 1 and located between the two buoys.

The first buoy and the second buoy are semi-cylindrical; the first buoy 2 is fixed on the left side of the net cage 10 on the lower surface of the plank platform 1, the second buoy 3 is fixed on the right side of the net cage 10 on the lower surface of the plank platform 1, and the semi-circular opening surfaces of the first buoy 2 and the second buoy 3 are in contact with and fixedly connected to the lower surface of the plank platform 1; the first buoy 2 and the second buoy 3 each can be spliced by multiple (i.e., more than one) sub-buoys, or integrally formed (i.e., in a form of one-piece structure); the buoys are mainly configured to ensure that the structure may float on the water surface, and the size and quantity of buoys depend on the actual situation.

The upper end of the first wave baffle 4 is fixedly connected to the left end of the lower surface of the plank platform 1 and perpendicular to the plank platform 1; the upper end of the second wave baffle 5 is fixedly connected to the right end of the lower surface of the plank platform 1 and perpendicular to the plank platform 1.

The lower end of the first arc breast wall 6 is fixedly connected to the left end of the upper surface of the plank platform 1, and the concave surface of the first arc breast wall 6 faces the outside of the plank platform 1. The lower end of the second arc breast wall 7 is fixedly connected to the right end of the upper surface of the plank platform 1, and the concave surface of second arc breast wall 7 faces the outside of the plank platform 1. The concave surfaces of the first arc breast wall 6 and the second arc breast wall 7 are provided with holes for installing the rotating wheels 11.

Two ends of the upper inclined supports 8 are respectively fixedly connected to the upper surface of the plank platform 1 and the middle of the convex surfaces of the arc breast walls and intended for reinforcing the arc breast walls. Two ends of the lower inclined supports 9 are respectively fixedly connected to the lower surface of the plank platform 1 and the inner surfaces of the wave baffles and intended for reinforcing the wave baffles. The upper inclined supports 8 are arranged at predetermined intervals between the upper surface of the plank platform and the first arc breast wall 6 as well as the second arc breast wall 7, to increase overall stiffness. The lower inclined supports 9 are arranged at predetermined intervals between the lower surface of the plank platform 1 and the first wave baffle 4 as well as the second wave baffle 5, to increase overall stiffness.

The left and right ends of the plank platform 1 are respectively provided with chains 12 for mooring the multifunctional floating breakwater.

Although the embodiments of the invention have been described above with reference to the attached drawings, the invention is not limited to the above specific embodiments, which are only illustrative and not restrictive, and ordinary technicians in the field may make more forms based on the invention without departing from the spirit of the invention and the scope protected by the claims, all of which fall within the scope of protection of the invention.

What is claimed is:

1. A multifunctional floating breakwater, comprising: a plank platform, a first buoy, a second buoy, a first wave baffle, a second wave baffle, a first arc breast wall, a second arc breast wall, upper inclined supports, lower inclined supports and a net cage;

wherein a middle part of the plank platform is provided with an opening, two ends of a lower surface of the plank platform are connected with the first wave baffle and the second wave baffle respectively, and two ends of an upper surface of the plank platform are connected with the first arc breast wall and the second arc breast wall respectively;

wherein the first buoy is fixed on a left side of the net cage on the lower surface of the plank platform, and the second buoy is fixed on a right side of the net cage on the lower surface of the plank platform; each of the first buoy and the second buoy is semi-cylindrical and a semi-circular opening surface thereof is in contact with and fixedly connected with the lower surface of the plank platform;

wherein an upper end of the first wave baffle is fixedly connected to a left one of the two ends of the lower surface of the plank platform and perpendicular to the plank platform; an upper end of the second wave baffle is fixedly connected to a right one of the two ends of the lower surface of the plank platform and perpendicular to the plank platform;

wherein a lower end of the first arc breast wall is fixedly connected to the left one of the two ends of the upper surface of the plank platform, and a concave surface of the first arc breast wall faces outside of the plank platform; a lower end of the second arc breast wall is fixedly connected to the right one of the two ends of the upper surface of the plank platform, and a concave surface of the second arc breast wall faces outside of the plank platform;

wherein two ends of each of the upper inclined supports are respectively fixedly connected to the upper surface of the plank platform and a convex surface of a corresponding one of the first and second arc breast walls; two ends of each of the lower inclined supports are respectively fixedly connected to the lower surface of the plank platform and an inner surface of a corresponding one of the first and second wave baffles; and wherein the net cage is fixedly connected to the lower surface of the plank platform and located between the first buoy and the second buoy.

2. The multifunctional floating breakwater according to claim 1, wherein the opening at the middle of the plank platform is directly connected into the net cage on lower surface of the plank platform.

3. The multifunctional floating breakwater according to claim 1, wherein the upper inclined supports are arranged at predetermined intervals between the upper surface of the plank platform and the first arc breast wall as well as the second arc breast wall.

4. The multifunctional floating breakwater according to claim 1, wherein the lower inclined supports are arranged at predetermined intervals between the lower surface of the plank platform and the first wave baffle as well as the second wave baffle.

5. The multifunctional floating breakwater according to claim 1, wherein each of the first buoy and the second buoy is spliced by a plurality of sub-buoys or is an integrally formed structure.

6. The multifunctional floating breakwater according to claim 1, wherein the concave surfaces of the first arc breast wall and the second arc breast wall are provided with holes, and rotating wheels are arranged in the holes.

7. The multifunctional floating breakwater according to claim 1, wherein left and right ends of the plank platform are respectively provided with chains.

* * * * *